US006999992B1

(12) United States Patent
Deen et al.

(10) Patent No.: US 6,999,992 B1
(45) Date of Patent: Feb. 14, 2006

(54) EFFICIENTLY SENDING EVENT NOTIFICATIONS OVER A COMPUTER NETWORK

(75) Inventors: Brian Deen, North Bend, WA (US); Joel Matthew Soderberg, Edmonds, WA (US); Alex Hopmann, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 09/680,122

(22) Filed: Oct. 4, 2000

(51) Int. Cl.
*G06F 15/16* (2006.01)

(52) U.S. Cl. ....................... 709/206; 709/219; 709/202

(58) Field of Classification Search ................ 709/206, 709/207, 228, 200, 203, 227, 202, 224, 219; 707/104, 10
See application file for complete search history.

(56) References Cited

U.S. PATENT DOCUMENTS 5,319,638 A * 6/1994 Lin ............................ 370/235
5,790,790 A * 8/1998 Smith et al. ................ 709/206
5,935,211 A * 8/1999 Osterman .................. 709/228
5,987,100 A * 11/1999 Fortman et al. ......... 379/88.14
6,041,327 A * 3/2000 Glitho et al. ................. 707/10
6,061,570 A * 5/2000 Janow ........................ 455/458
6,070,184 A * 5/2000 Blount et al. ............... 709/200
6,131,118 A * 10/2000 Stupek et al. ............... 709/223
6,208,996 B1 * 3/2001 Ben-Shachar et al. ... 707/104.1
6,385,644 B1 * 5/2002 Devine et al. .............. 709/206
6,463,464 B1 * 10/2002 Lazaridis et al. ........... 709/207
6,574,630 B1 * 6/2003 Augustine et al. ............ 707/10
6,577,618 B1 * 6/2003 Diachina et al. ............ 370/348
6,618,747 B1 * 9/2003 Flynn et al. ................ 709/206
6,704,786 B1 * 3/2004 Gupta et al. ................ 709/228

* cited by examiner

*Primary Examiner*—David Wiley
*Assistant Examiner*—Michael Delgado
(74) *Attorney, Agent, or Firm*—Workman Nydegger

(57) ABSTRACT

A method for efficiently sending notifications over a network. A client system requests to be notified when an event occurs. A server system receives the requests and monitors for the occurrence of the event. When the event occurs a single packet using a connectionless protocol (such as User Datagram Protocol) is sent to the client to notify the client of the occurrence of the event. Using a connectionless protocol to send notification reduces the overall amount of data on the network and thus reduces network congestion and the processing capacity of the server and client. When the client system receives notification an attempt to establish a connection using as connection-oriented protocol is executed. Additional data associated with the occurrence of the event is transferred over the connection. The server may repeatedly send notification using a connectionless protocol until a connection using a connection-oriented protocol is established. The server may send notification that notifies the client of the occurrence of multiple events simultaneously within a single packet. The server may also notify multiple applications of the occurrence of an event using a single notification.

22 Claims, 9 Drawing Sheets

EFFICIENTLY SENDING EVENT NOTIFICATIONS OVER A COMPUTER NETWORK

BACKGROUND OF THE INVENTION

1. The Field of the Invention

The present invention relates to methods and systems for efficiently sending event notification to a device over a computer network. More specifically, the present invention relates to methods and systems for computing devices included in an Internet Protocol network to monitor for the occurrence of events on the Internet Protocol network and send a notification, using the User Datagram Protocol, to other devices on the Internet Protocol network when an event occurs.

2. The Prior State of the Art

The popularity of the Internet has profoundly improved the way people communicate by allowing users quick and easy access to information. By accessing the World Wide Web and electronic mail through computers and other devices, people now stay in touch with each other around the globe, and can access information on a virtually limitless variety of subjects.

In addition to communication between individuals, the Internet allows individuals (or devices) to be notified when an event occurs. A remote computer system will typically monitor for the event and automatically send a notification message to the user when the event occurs. This allows users to be aware of numerous important events that the user would not otherwise be aware of. Traditional methods of notifying a user were developed using the Transmission Control Protocol ("TCP'), a well-known protocol already in use on the Internet.

TCP has certain advantages that make it useful for some forms of communication on the Internet. For example, TCP is connection-oriented, meaning it uses algorithms that pass connection data between devices to verify a connection to a device before it sends information. TCP also keeps track of state information, meaning it sends monitoring parameters across connections as data transfers from one device to another to verify the connection is still operating properly. TCP also uses sequencing algorithms which guarantee data is received in the same order data was sent. As a result of TCP's built in features, TCP is also capable of establishing secure connections between devices on the Internet. Indeed, the features of TCP make it well suited for sending substantial amounts of information or for guaranteeing secure transmission.

However, there are certain disadvantages of using TCP. First, since TCP is a connection-oriented protocol, it must establish a connection to a device before any data can transfer across the wire. Then TCP must tear the connection down once the data is transferred. This includes the overhead associated with the algorithms that send connection data used to verify a reliable connection.

Second, since TCP maintains state information on established connections during data transfer operations, unneeded data crosses the wire thereby congesting Internet use. This is a result of not only sending packets across the wire, but sending the extra data associated with the state information algorithms that are a part of TCP.

Third, there is additional processing and bandwidth demand associated with maintaining the proper ordering of data packets in a single message. This may also place a strain on the bandwidth of the Internet, as well as on the processing capabilities of the client and server involved in the notification.

The disadvantages of TCP apply to the sending of event notifications as well as for other types of data transfer over the Internet. Therefore, what are desired are methods and systems for sending event notifications that are more efficient then those methods currently employed using TCP.

In addition to the above-described problems of the inefficiency of TCP for use in event notification are the inefficiencies associated with the event notification programs employing TCP. Current notification methods attempt notification of a device for each occurrence of the event. For instance, if an event occurs five times, notification will take place five times. However, depending on the type of event, repeatedly notifying the user of the event may often waste network bandwidth if the notifications are redundant.

Another drawback of current TCP methods is the establishment of a separate TCP connection to send notification of a singular event to multiple applications running on the same device. For instance if application 1 and application 2 are to be notified when event X occurs, current methods establish a TCP connection to notify application 1 of event X and a separate TCP connection to notify application 2 of event X. However, since application 1 and application 2 are running on the same device, multiple notifications may be redundant.

It is important with the ever increasing number of users sending data across the Internet that event notification on the Internet is done as efficiently as possible. Accordingly, methods and systems are desired for sending event notification, which reduce Internet congestion and computer processing time.

SUMMARY OF THE INVENTION

The present invention relates to a method for efficiently notifying a computer of the occurrence of an event. A server system and a client system are each associated with a network system, such as the Internet or any other computer network, and communicate across the associated network system. The client system requests the server system to send notification to the client system when the server system detects the occurrence of the certain events. The server system monitors the certain events and, if one occurs, the server system sends a single packet of data to the client system notifying the client system of the occurrence.

When a server system monitors for the occurrence of an event, it must often notify multiple client systems as well as multiple applications running on the same client systems that the event occurred. Because the server system is capable of storing a list of what client systems require notification when an event occurs, the occurrence of an event is followed by a series of acts performed at the server system, which ensure that all clients requiring notification are efficiently sent notification of the occurrence. In absence of these acts, the server system could send multiple notifications to the same client system or repeatedly send the same notification to a client system, using a connection-oriented protocol such as TCP or any other connection-oriented protocol using state information and message sequencing, thereby contributing to congestion on the network.

In operation, the server system receives data from each client system concerning which events require client system notification. Often, the server system will have data in addition to the notification to send to the client system. In this situation, the server system will transmit a notification to the client system using a connectionless protocol, such as User Datagram Protocol ("UDP") or any other protocol not requiring a connection before transmitting data. The server system then waits to receive communication from the client system via TCP, or any other connection-oriented protocol, and transmits the additional information using the connection-oriented protocol.

If the server system does not receive communication from the client system via a connection-oriented protocol, the server system retransmits the notification. Retransmission takes place with decreasing frequency until the server system receives communication from the client system via a connection-oriented protocol or until a timeout period has elapsed. If the timeout period elapses the server system concludes communication to the client system is not reliable and stops sending the notifications in order to save network bandwidth.

In some instances, an event will occur frequently in a short period time, but sending multiple notifications to the client system of the occurrence of the event would be redundant. The server system accounts for this by filtering out redundant notification messages. When a monitored event occurs, the server system determines when the last occurrence of the event happened. If the previous occurrence was very recent, a new notification is not sent to the client system.

The server system can also queue up a series of notifications bound for a single client system and send all the notifications in one packet. When an event occurs that requires notification, the server system stores the event information and continues monitoring for the occurrence of other events. When another event occurs requiring notification of the same client system, the server system again stores the event data and continues monitoring. When the number of events stored reaches a certain level, the server system sends notification to the client system of all the events. Notification takes place by including all the associated notification data for all stored events in a single data packet. The packet is then transmitted to the client system using a connectionless protocol.

The client system also performs certain acts that promote efficient transmission of notifications across of the network. In most instances, the client system is associated with multiple applications that it services. If more then one of the multiple applications requires notification of the occurrence of the same event, the client system only transmits one request for notification to the server system. The client system tracks which applications requested notification of which events. When the client system receives an event notification, the client system relays the notification data to the applications that requested notification. Thus, only one notification need be sent to the client system.

A significant benefit of the current invention is the reduced amount of data that must pass across the network to notify a client system of the occurrence of an event. Using a connectionless protocol to send notification eliminates overhead normally associated with connection-oriented protocols. This conserves processing power on the server and client and reduces network congestion.

Additionally, the server system reduces the frequency with which it sends notifications and eventually stops sending the notifications if it concludes there is an error in communication to the client. As a result, less data is transmitted onto the network.

Furthermore, the act of the server system storing a series of event notifications for transmission all in one packet reduces network congestion. Since multiple notifications are all contained in one data packet, the server system is able to send less data packets to notify the client system of all the events for which the client system requested notification.

Finally, the client system's ability to track which applications need to receive a notification also reduces network congestion. Since the client system tracks which associated applications need notification, the server system does not need to send a packet to notify each application individually. This results in the server system transmitting less data on the network.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
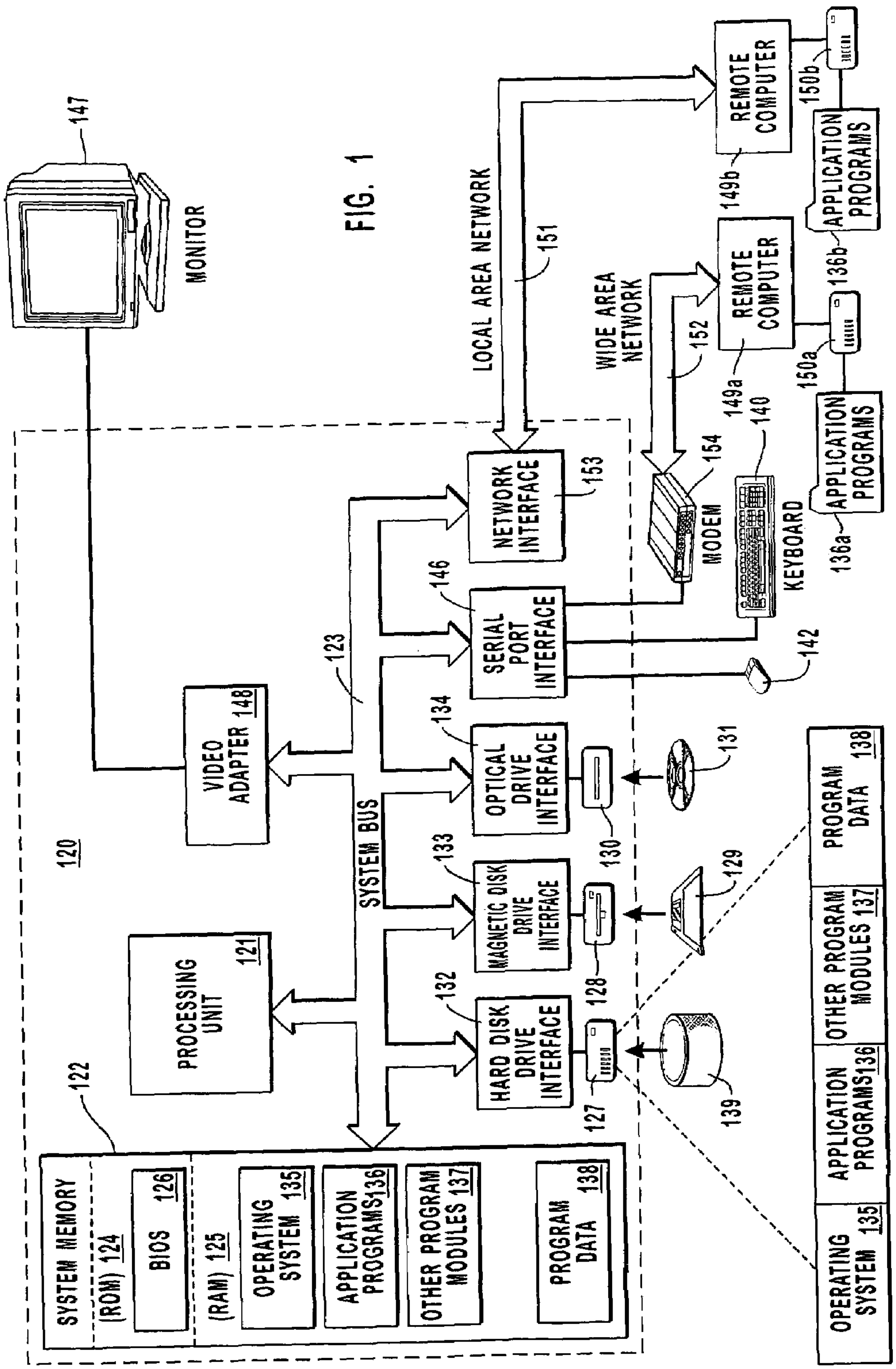
FIG. 1 illustrates an exemplary system that provides a suitable operating environment for the present invention.

The present invention extends to a method for efficiently sending notification of the occurrence of an event over a computer network. The computer network includes at least one server system and one client system communicating with each other as well as other devices over a communication link. The server system monitors events and when a particular event occurs, the server system sends notification of the event occurrence to the client system. Both the server system and the client system are capable of communicating using a variety of transmission protocols, as discussed in greater detail below.

The term "connectionless protocol" refers to protocols where a session is not established between two network devices before data transmission begins. Thus, there is no guarantee that the packets will get to the destination in the order they that were sent, or even at all. By way of example, and not limitation, User Datagram Protocol ("UDP") is a connectionless protocol.

In contrast, the term "connection-oriented protocol" refers to protocols where a session is established between two network devices before data transmission begins. Connection-oriented protocols often facilitate verification of the correct delivery of data between two network devices. Intermediate networks between the data's source and destination can cause data to be lost or out of order. Connection-oriented protocols correct this by detecting errors or lost data and triggering retransmission until the data is correctly and completely received. By way of example, and not limitation, Transmission Control Protocol ("TCP") is a connection-oriented protocol.

The embodiments of the present invention may comprise a special purpose or general purpose computer including various computer hardware. Additionally, embodiments within the scope of the present invention also include computer-readable media for carrying or having computer-executable instructions or data structures stored thereon. Such computer-readable media can be any available media, which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149*a* and 149*b*. Remote computers 149*a* and 149*b* may each be another personal computer, a server, a router, a network PC, a peer device or other common network node, and typically include many or all of the elements described above relative to the computer 120, although only memory storage devices 150*a* and 150*b* and their associated application programs 136*a* and 36*b* have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

In this description and in the following claims, a "computer system" is defined as a general purpose or special purpose computer or any other computing device including, but not limited to, various computer hardware components including those illustrated in FIG. 1. A "client system" is defined as a computer system, group of computer systems, other devices that might be associated with a network system, or combination thereof, that use the services of another computer system. A "server system" is defined as a computer system, group of computer systems, other devices that might be associated with a network system, or combination thereof, that provide services to another computer system. A "network system" is defined as a plurality of interconnected computer systems and other network devices capable of being interconnected to computer systems.

Note that a computer system may use the services of another computer system and yet still provide services to other computer systems. Thus, a client system in one context may also be a server system in another context. Similarly, a server system in one context may also be a client system in another context. This principal is applicable to all embodiments of the present invention.

Figure 2:
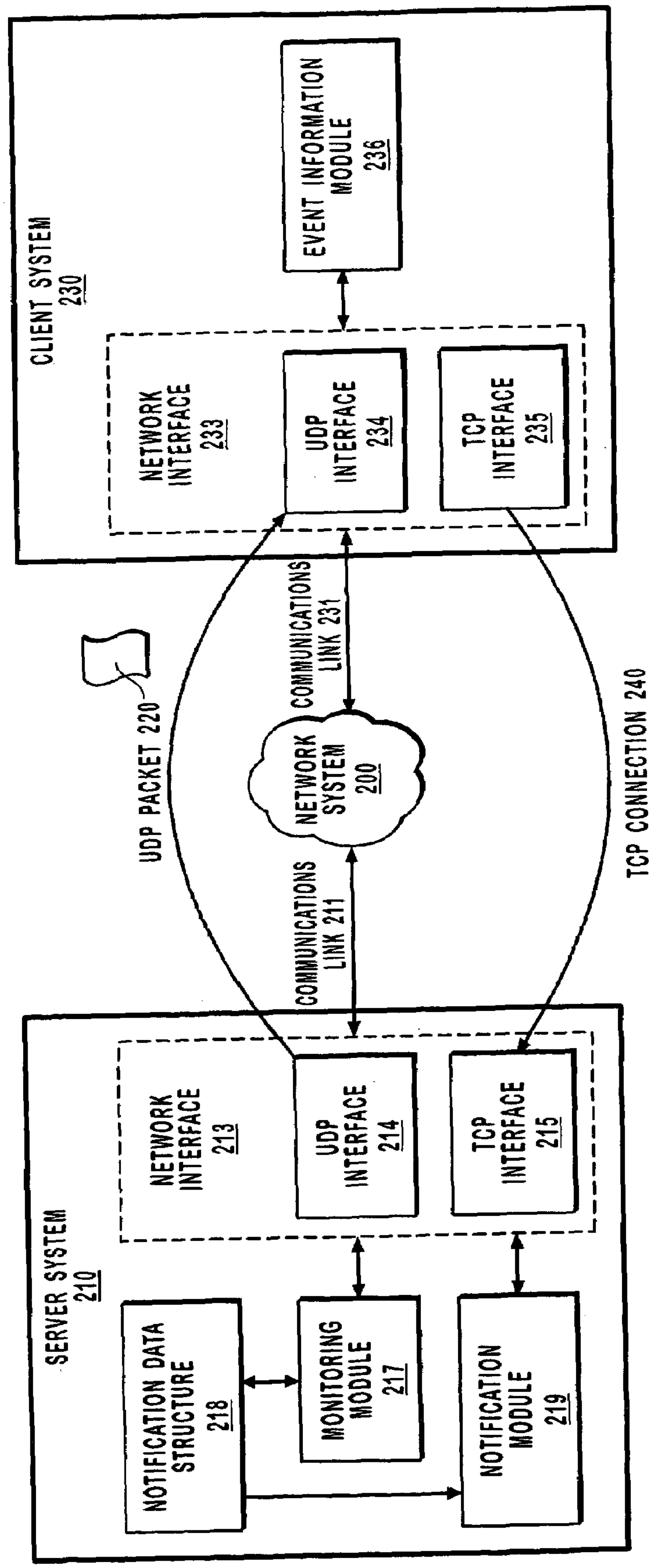
FIG. 2 illustrates some of the functional components present in a network system where event notification is sent using a connectionless protocol.

FIG. 2 illustrates a network configuration suitable for implementing the principles of the present invention. The configuration includes a server system 210 and a client system 230. Although only one server system and one system client are illustrated in FIG. 2, the general principals disclosed herein can be readily adapted to configurations having any number of client systems and server systems in combination. Network interface 213 connects server system 210 to network system 200 over communication link 211. Likewise, network interface 233 connects client system 230 to network system 200 over communication link 231. Network system 200 can be an Ethernet, token ring, Arcnet, or any other network configuration or combination thereof, including the Internet, by which server system 210 and client system 230 can communicate with each other and other devices included in network system 200.

In the embodiment illustrated in FIG. 2, both server system 210 and client system 230 are capable of sending data to and receiving data from each other, as well as other devices included in network 200, through network interfaces 213 and 233 respectively. Network interface 213 and network interface 233 can be configured to communicate using any number of protocols well known in the art. However, in this representative example, network interface 213 and network interface 233 are configured to communicate using the TCP and UDP protocols. Network interface 213 communicates using UDP through UDP interface 214 and using TCP through TCP interface 215. Likewise, network interface 233 communicates using UDP through UDP interface 234 and using TCP through TCP interface 235.

In operation, server system 210 receives a request (either from the client system 230 or from another computer system) requesting server system 210 notify client system 230 when a certain event or events occur. Alternatively, the server system 210 may determine that notification of the certain event(s) should be sent based on an internal configuration setting. The certain events may include, but are not limited to, the status of devices on network system 200, a change in stock prices, the receipt of electronic mail, or any other event that server system 210 is capable of detecting.

The notification data structure 218 of server system 210 stores data associated with notification requests for client system 230. Notification data structure 218 can contain the event for which the client system is to receive notification, an address associated client system 230, or any other information transmitted to server system 210 in the notification request for an event. Storage locations for notification data structure 218 include, but are not limited to, any of the storage areas associated with computer 120 in FIG. 1, any other device or devices associated with network system 200, and the like.

Once server system 210 receives an event notification request or otherwise determines that event notification should occur, monitoring module 217 begins to monitor for the occurrence of the event. Monitoring module 217 receives data from all sources associated with the occurrence of the requested event. These sources may include, but are not limited to, components of server system 210, for example those components associated with computer 120 in FIG. 1, other devices included on network system 200, other electromechanical devices, or any other source from which server system 210 may receive input. Monitoring module 217 may simultaneously monitor any number of sources in addition to the sources associated with the events client system requested notification of.

If data from a monitored source indicates an event has occurred, monitoring module 217 receives data from notification data structure 218 to determine if client system 230 has requested notification of the occurred event. If client system 230 has not requested notification of the occurred event, monitoring module 217 continues to monitor for occurrences of events, including, but not limited to, any events for which client system 230 has requested notification. However, if client system 230 has requested notification of the occurred event, notification module 219 receives data associated with notification data structure 218, including but not limited to, an address associated with client system 230. Notification module 219 then causes UDP interface 214 to send UDP packet 220 to client system 230. UDP packet 220 contains notification of the event, as well as, notification that server system 210 has additional data to send to client system 230.

In an alternative embodiment (not shown), the monitoring modules implement logic components that monitor for a specific event only if the server system 210 determines that monitoring is appropriate either by an external request or by an internal configuration setting. For each event, the server system 210 (or the monitoring module 217) calls a module specific to the event, the module returning when the event has occurred. When the event occurs, the monitoring module 217 is notified of the occurrence. The monitoring module 217 then causes UDP interface 214 to send UDP packet 220 to client system 230.

In either embodiment, client system 230 receives UDP packet 220 though UDP interface 234. Event information module 236 then receives the data contained in the packet. Event information module 236 checks the notification data to determine if server system 210 has additional information to send to client system 230. If event information module 236 determines server system 210 has additional information to send, information module 236 causes TCP interface 235 to attempt to establish TCP connection 240 to server system 210. Once TCP connection 240 is established from client system 230 to server system 210, notification module 219 causes TCP interface 215 to send the additional data across TCP connection 240 to client system 230.

Figure 3:
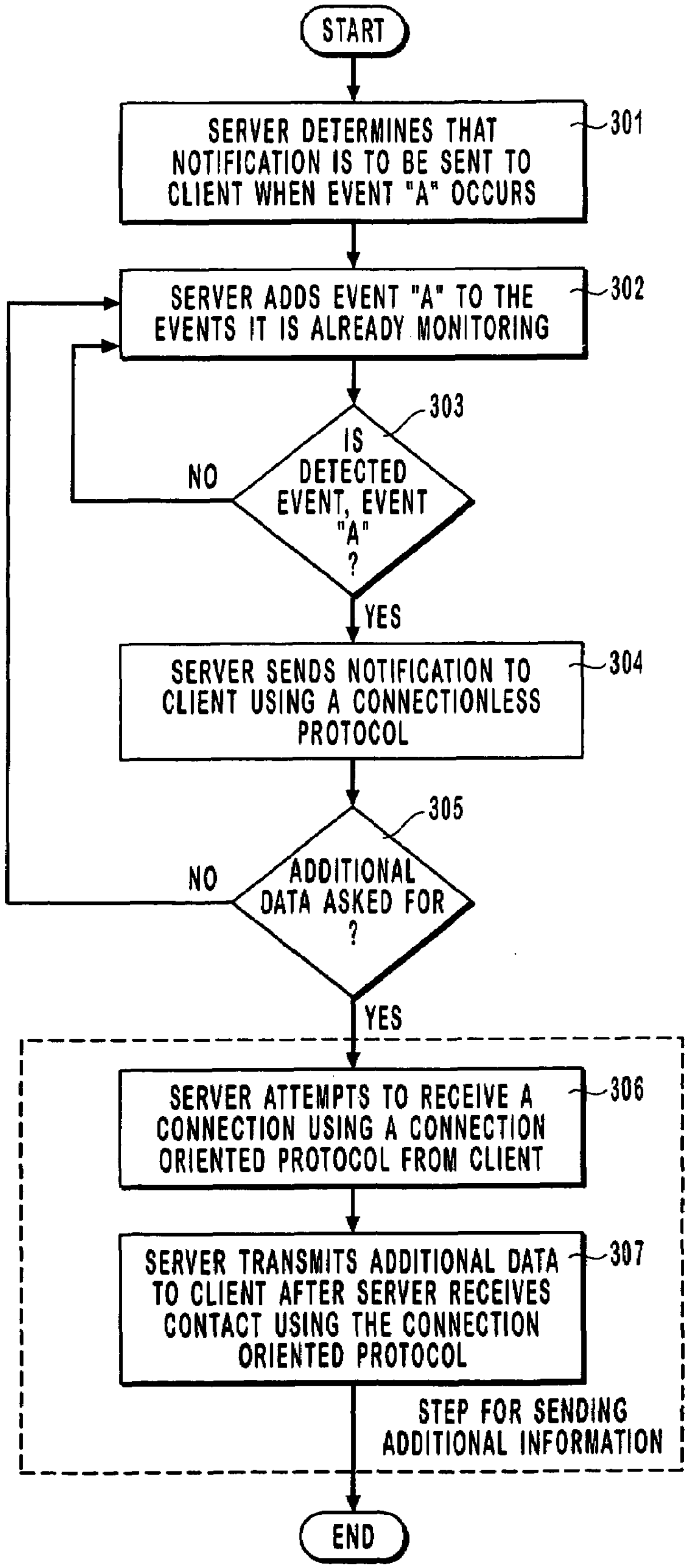
FIG. 3 is a flow diagram illustrating a method whereby a server system sends event notification to a client system using connectionless protocol and then sends additional information to the client system using a connection-oriented protocol.

The operation of the structure of FIG. 2 will now be described with respect to FIG. 3, which is a flowchart of the server operation for each event notification. The server system 210 first determines that a notification of the occurrence of event A is to be sent to the client system 230 when event A occurs (act 301). In one embodiment of the invention, the client system will request that it be notified of the occurrence of event A. In another embodiment of the invention, another network device may request that the client system be notified of the occurrence of event A. In yet another embodiment, the server system may make the determination based on an internal configuration setting.

Next, the server system begins to monitor for the occurrence of event A, in addition to events it is already monitoring (act 302). Such monitoring includes, but is not limited to, polling the monitored device, receiving asynchronous messages or interrupts from the monitored device, or any other method by which the server can receive data associated with the monitored device.

The server system then detects the occurrence of a monitored event and determines if the event that occurred was event A (decision block 303). Methods by which the occurrence of an event can be detected include, but are not limited to, the server system comparing the data associated with the monitored device at different times, receiving a message from the monitored device, receiving a message from an associated network device, or any other method by which the server system can receive data associated with the monitored device.

In one embodiment, the server system determines if event A occurred by having access to a data structure associated with the request for notification of event A. By comparing data associated with the monitored event to data associated with the data structure, the server can determine if the monitored event was event A. In an alternative embodiment, where a module is monitoring only for the occurrence of event A. The module will notify server system when event A occurs.

If the monitored event was not event A (NO in decision block 303), the method returns to act 302 and resumes monitoring for events. If however the event was event A (YES in decision block 303), the server system sends notification of the event to the client system using a connectionless protocol (act 304). By way of example, and not limitation, connectionless protocols include: UDP or any other protocol where a session is not established between two devices before transmission begins.

The server system then determines if it has additional data to send to the client system (decision block 305). If the server system determines there is no additional information to send to the client system (NO in decision block 305), the method returns to act 302 and the server system resumes monitoring for events. If the server system determines there is additional information to send to the client system (YES in decision block 305), the server system performs the step for sending the additional data using a connection-oriented protocol. In one embodiment, this may include the server system receiving a connection from the client system using a connection-oriented protocol (act 306) and then the server system sending the additional data to the client system over the connection (act 307). By way of example, and not limitation, connection-oriented protocols include: TCP or any other protocol where a session is established between two devices before transmission begins.

Figure 4:
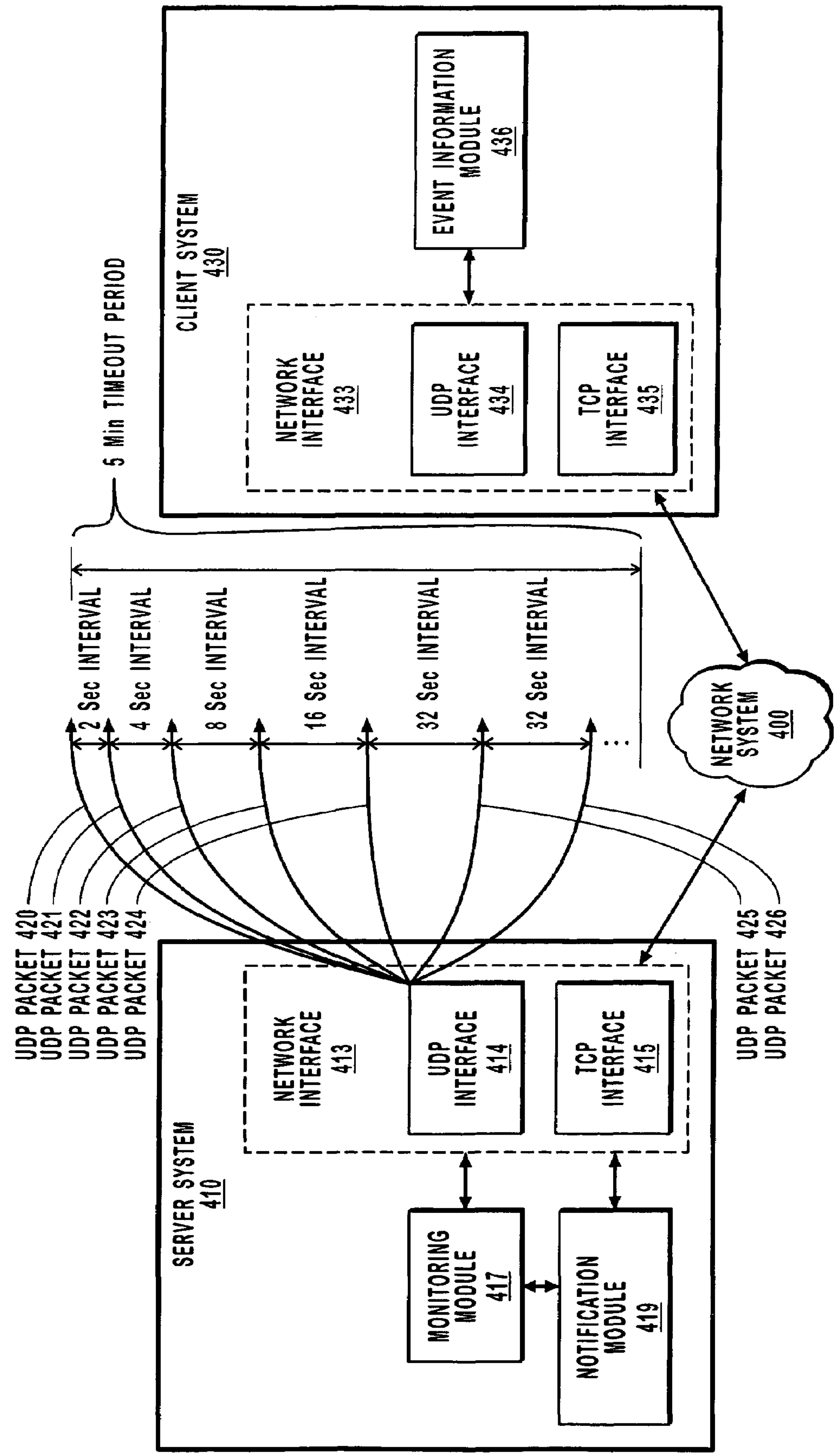
FIG. 4 illustrates some of the functional components present in a network system where multiple attempts at event notification are sent using a connectionless protocol.

In another embodiment of the invention, shown in FIG. 4, server system 410 is enabled to resend notifications to client system 430. Server system 410 is configured with network interface 413, which is similar in configuration to network interface 213 show in FIG. 2. Additionally, UDP interface 414 is similar to UDP interface 214, TCP interface 415 is similar to TCP interface 215, monitoring module 417 is similar to monitoring module 217, and notification module 419 is similar to notification module 419. Client system 430 is configured with network interface 433, which is similar in configuration to network interface 233 show in FIG. 2. Additionally, UDP interface 434 and TCP interface 435 are similar to UDP interface 234 and TCP interface 235 respectively, as show in FIG. 2. Also, event notification module 436 is similar to event notification module 236.

In operation, monitoring module 417, which is similar to monitoring module 217, monitors for the occurrence of an event for which server system 410 must notify client system 430 of. Notification module 419 receives data associated with the occurrence of the event. Notification module 419 then causes UDP interface 414 to send UDP packet 420 to client system 430.

Server system 410 then waits to receive a TCP connection from client system 430. If server system 410 does not detect reception of a TCP connection from client system 430 within a time interval, notification module 419 causes UDP interface 414 to send UDP packet 421 to client system 430. Server system 410 again waits to receive a TCP connection from client system 430. If server system 410 does not detect reception of a TCP connection from client system 430 within a time interval, server system 410 sends the UDP packet 422 using the same method. Server system 410 continues to attempt notification until a TCP connection from client system 430 is received or a timeout period expires.

In the embodiment shown in FIG. 4, the time interval between each notification attempt increases when a TCP connection is not detected before the prior time interval elapses. However this is not required. The time interval between notification attempts may be the same or may be configured to vary including, but not limited to, decreasing the time interval between each notification attempt, setting a maximum or minimum time interval or varying the length of the time interval between notification attempts in any other way.

In one embodiment, UDP interface 414 sends UDP packet 420 and then waits for two seconds to receive a TCP connection from client system 430. If a TCP connection is not received within two seconds, UDP interface 414 sends UDP packet 421 and waits four seconds to receive a TCP connection from client system 430. In this example embodiment, the time interval is doubled between each successive notification attempt, until a maximum interval of 32 seconds is reached. Resending will continue until server system 410 receives a TCP connection from client system 430 or a timeout period of five minutes expires, at which time UDP interface 414 will cease to send event notifications to client system 430.

Figure 5:
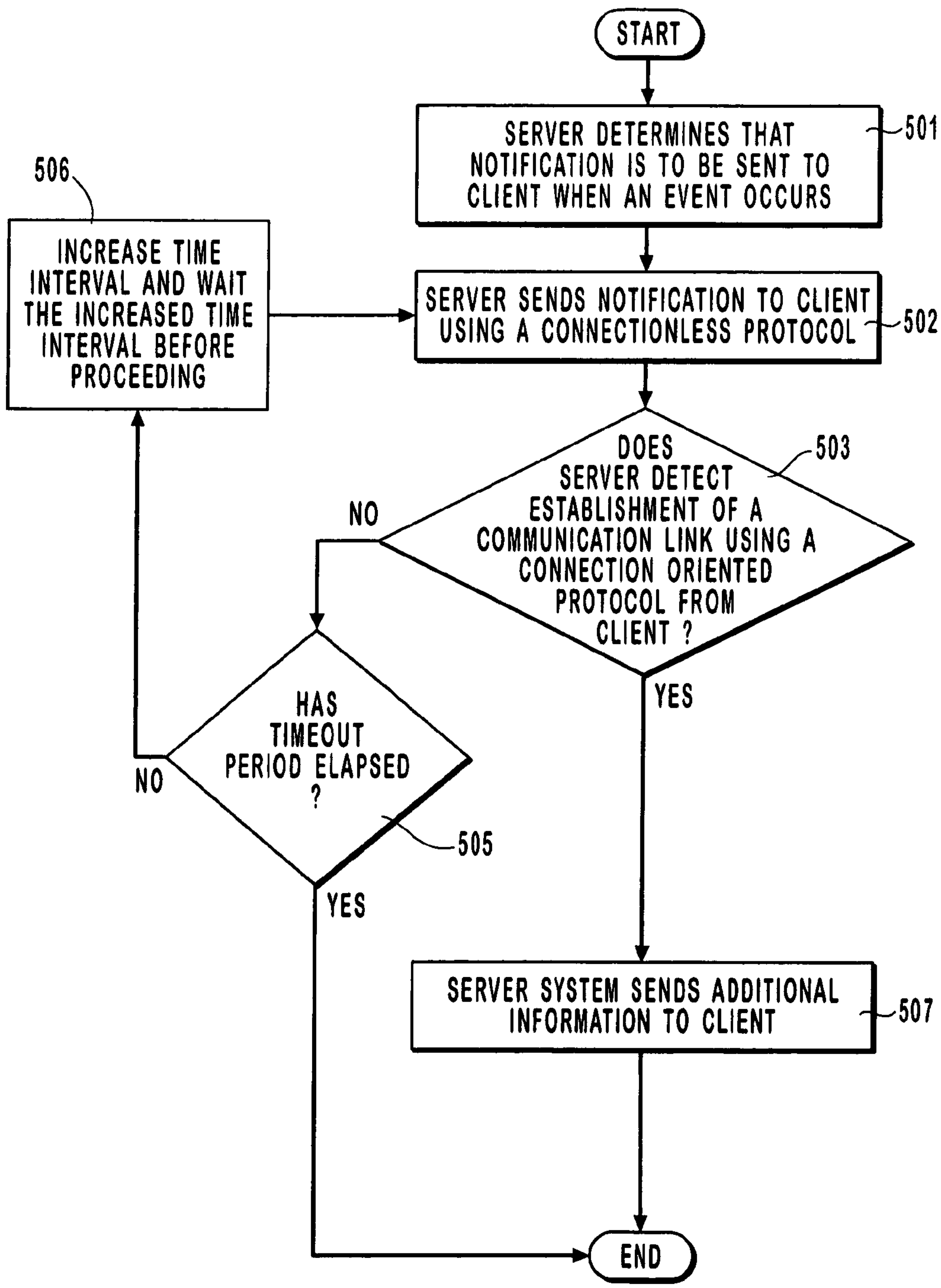
FIG. 5 is a flow diagram illustrating a method whereby a server system resends event notification at time intervals until a connection is established using a connection-oriented protocol or until a timeout period has expired.

Turning now to FIG. 5, the server system 410 first determines that a notification of the occurrence of event A is to be sent to the client system 430 when event A occurs (act 501). The server system can make this determination by the method of FIG. 3.

The server system then sends a notification to the client system using a connectionless protocol (act 502) to attempt to notify the client system of the occurrence of the event and, optionally, that there is additional information to send the client. The connectionless protocol can be any of the connectionless protocols included in the performance of act 304 in FIG. 3 such as UDP, for example.

The server system then determines whether or not a communication link using a connection-oriented protocol has been established from the client system (decision block 503). Connection-oriented protocols can be any of the connection-oriented protocols included in act 306 of FIG. 3 such as TCP, for example.

If no such communication link is detected (NO in decision block 503), the server system determines whether or not a timeout period has elapsed (decision block 505). The timeout period refers to the maximum amount time the resending of notification data will continue without the establishment of a connection. If the timeout period has elapsed (YES in decision block 505), the method of FIG. 5 ends without sending any notification data to the client system. If, however the timeout period has not elapsed (NO in decision block 505), the time interval between resending notifications is increased (act 506). When the time interval is increased, this increases the amount of delay before notification data may be resent to the client system. By way of example, and not limitation, the time interval might initially be two seconds. The first performance of act 506 would then increase the time interval to four seconds and the next attempt at resending notification data to the client system would then be in four seconds. If, at any point during the resending of the notification data, a communication link using a connection-oriented protocol is established from the client system (YES in decision block 503), then additional data is sent to the client system (act 507).

Figure 6:
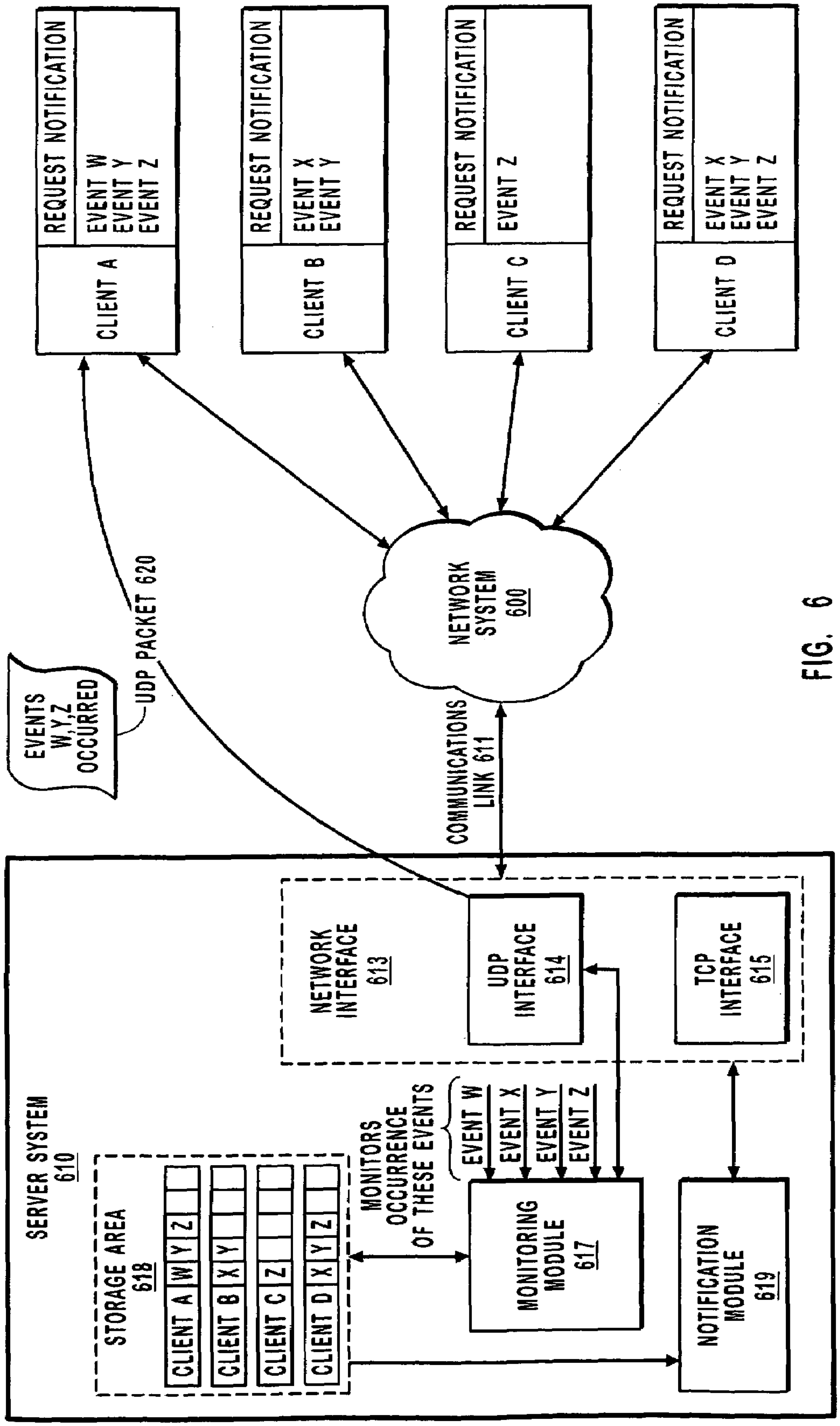
FIG. 6 illustrates some of the functional components present in a network system where a server system sends notification of the occurrence of multiple events simultaneously by using a connectionless protocol.

In another alternative embodiment of the invention, shown in FIG. 6, server system 610 is enabled to send notifications to client systems A, B, C and D. Server system 610 is further enabled to send multiple notifications to a client simultaneously.

Server system 610 is configured with network interface 613, which is similar in configuration to network interface 213 show in FIG. 2. Additionally, UDP interface 614 is similar to UDP interface 214, monitoring module 617 is similar to monitoring module 217 and notification module 619 is similar to notification module 219.

In operation, server system 610 receives a request, either generated internally or from an associated device, requesting server system 610 notify a client system when a certain event or events occur. By way of example, and not limitation, possible locations for generation of a notification request include, any of the components association with server system 610, the client system that will receive the notification, or any device associated with network system 600.

Storage area 618 may be associated with server system 610. However, this is not required. Server system 610 may receive requests for notification and pass the requests on to another device on network system 600. Furthermore, server system 610 may send notification of the occurrence of an event to another device on network system 600, which is associated with storage area 618. Also, while storage area 618 may be located on server system 610, this is also not required. Within storage area 618, client systems A, B, C, and D each are associated with separate storage locations.

In this example, when monitoring module 617 monitors for the occurrence of an event, it associates the event occurrence with each client system that requested notification of the event. As monitoring module 617 detects the occurrence of additional requested events, data associated with these events is included in the appropriate storage locations. For example, suppose client system A is to be notified if event W, Y or Z occurs. If event W occurs, then data associate with event W would be included in the storage location corresponding to client system A. Subsequently, if events Y and Z occur, then the data associate with events Y and Z will be also be included in the storage location corresponding to client system A.

When a determination is made to send a notification to a client system, notification module 619 causes UDP interface 614 to send a UDP packet to the client system. UDP packet 620 contains notification of all the events included in the client system's separate storage location.

By way of example, and not limitation, with reference to FIG. 6, monitoring module 617 has detected the occurrence of events W, X, Y, and Z. While this example illustrates detecting the occurrence of four events, there is no limitation on the minimum or maximum number of detected events, nor is there any limitation on the order the events may occur. This is illustrative of only one of the possible environments in which the method may be practiced.

When it is determined that client system A should be notified, notification module 619 causes UDP interface 614 to send UDP packet 620 to the client system A. UDP packet 620 contains notification that the events W, Y, and Z occurred. Thus, upon receipt of UDP packet 620, client system A is notified of the occurrence of events W, Y, and Z simultaneously.

Figure 7:
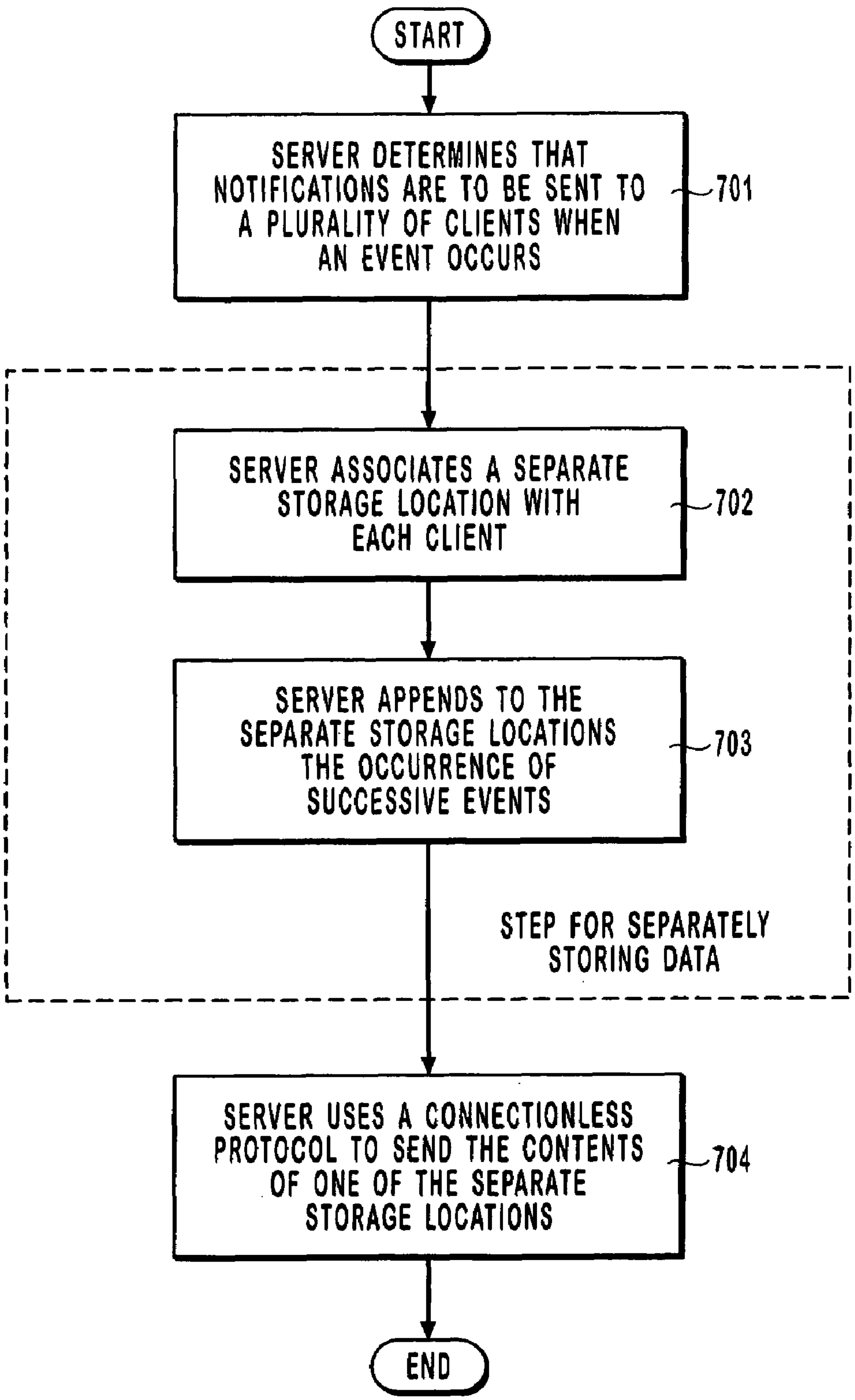
FIG. 7 is a flow diagram illustrating a method whereby a server system notifies a client system of the occurrence of multiple events simultaneously.

Turning now to FIG. 7, the server system determines that notifications are to be sent to a plurality of client systems (act 701). The server system can make this determination for each individual client systems using the method of FIG. 3.

When the server system determines that notifications are to be sent to multiple clients, the server system performs a step for separately storing data relating to the occurrence of events for each of the client systems. Separately storing related data enables the server to efficiently send a client notification of all the events that the client requested notification of.

In one embodiment of this step, a separate storage location is associated with each client (act 702). Data associated with the occurrence of events is then appended to the separate storage locations (act 703) for each client in order to save a record of the occurrence of the events until notification is ready to be sent to that client. In operation, for each client, data associated with the occurrence of new events for that client is associated with the data from previous events for that client.

A connectionless protocol is then used to send the contents of one of the separate storage locations to the associated client to notify the client of all the events simultaneously (act 704). In this embodiment, if the notification protocol were UDP, notification data, including notification of all the events stored in the separate storage location, would be sent to the client in one UDP packet.

Figure 8:
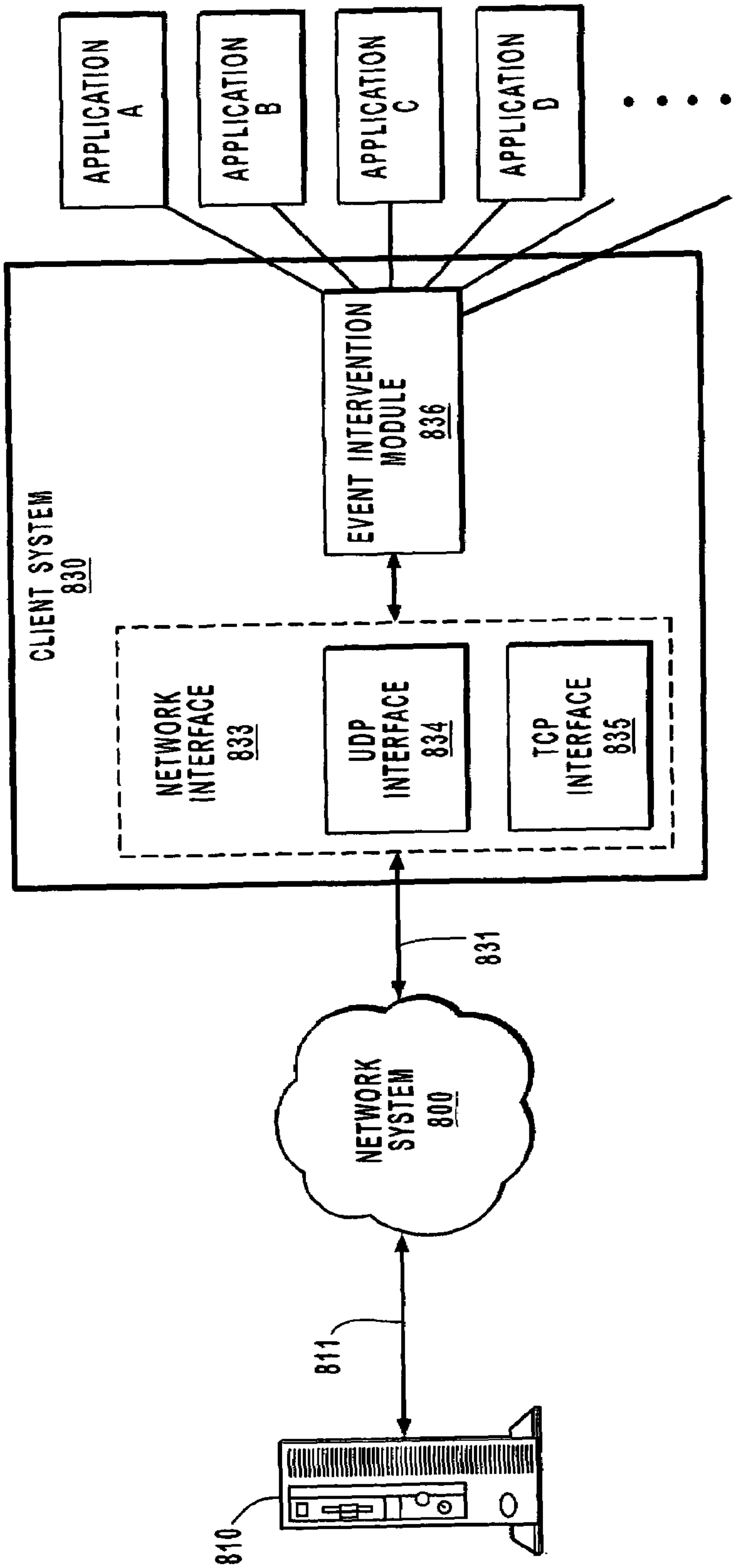
FIG. 8 illustrates some of the functional components present in a network system where only one notification is sent from a server system to notify multiple applications on the client system of the occurrence of an event.

In another embodiment of the invention, shown in FIG. 8, server system 810 monitors for the occurrence of events. Client system 830 receives notifications of the occurrence of events. As the client system 830 receives each notification, the client notifies multiple associated applications of the occurrence of an event. In this representative example, client system 830 is associated with event information module 836. Additionally, event information module 836 is associated with applications A, B, C, and D.

In operation, when an associated application, in this instance applications A, B, C, or D, requests notification of an event, information module 836 determines if any other associated applications has previously requested notification of the same event. If no associated applications have requested notification of the event, a notification request is sent to server system 810. However, if another associated application previously requested notification of the event, no notification request is sent. When event information module 836 receives a notification message, it determines which of the associated applications requested notification of the event and causes notification to be sent to those applications.

Figure 9:
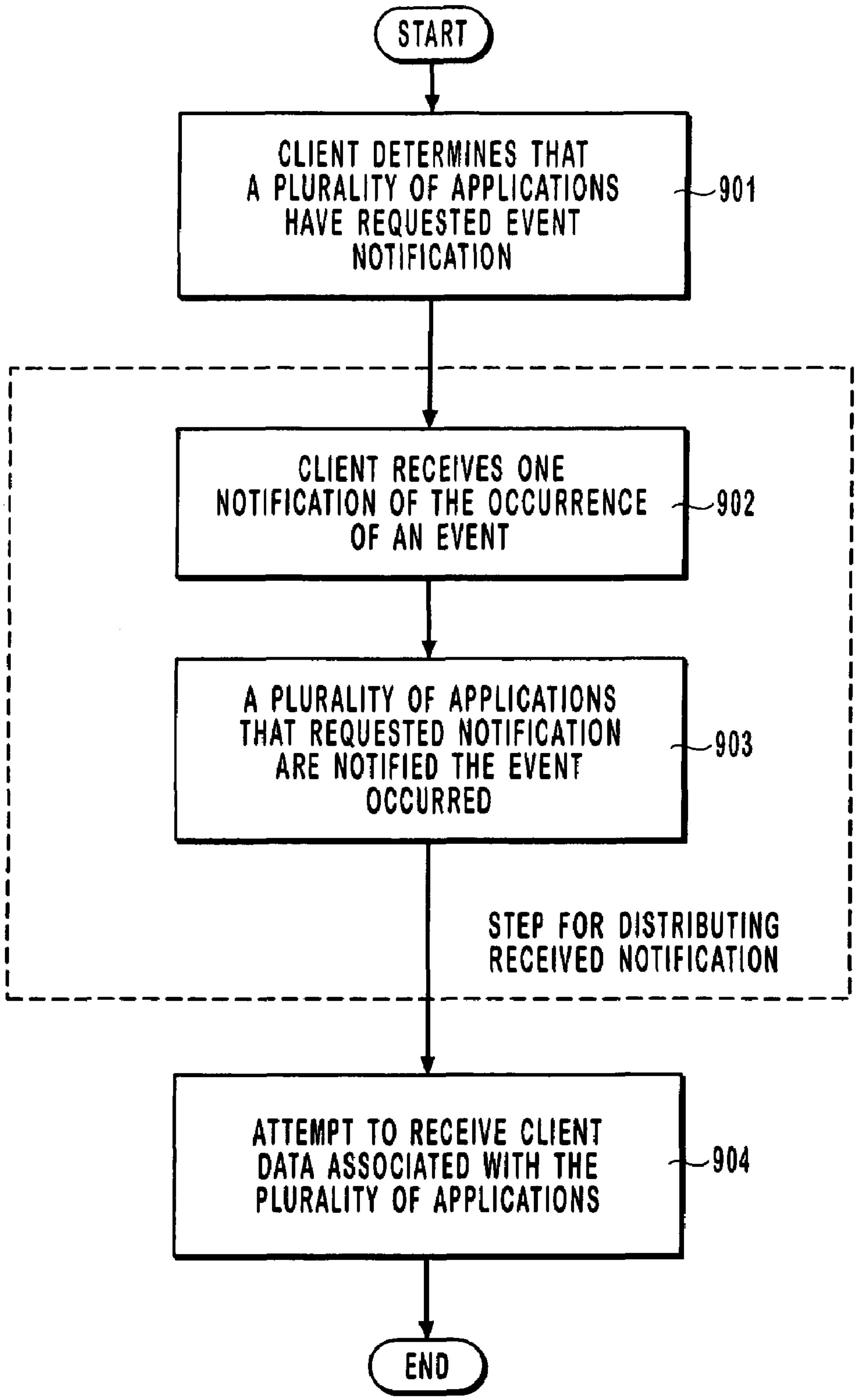
FIG. 9 is a flow diagram illustrating a method whereby a client receives one notification of the occurrence of an event and multiple applications running on the client system are notified of the occurrence of the event.

Turning now to FIG. 9, the client system 830 determines that one or more of a plurality of associated applications has requested notification of the occurrence of an event (act 901). Once the client system determines which associated applications requested notification of the occurrence of the event, a step is performed for distributing a received notification to the associated applications that requested notification. In one embodiment, this may include the client system receiving one notification of the occurrence of an event (act 902) using a connectionless protocol notifying client system of the occurrence of the event. The client system will typically receive the notification from the server system, other devices associated with network system 800, or associated modules. However, these are only examples and are not intended to limit the scope of the invention. The connectionless protocol may be any of the protocols associated with step 304 in FIG. 3.

The one or more of the plurality of applications then receive notification of the occurrence of the event (act 903). The one or more of the plurality of applications may receive notification from, including, but not limited to, the client, other devices associated with network system 800, modules associated with the one or more of the plurality of applications, other electromechanical devices, or any other entity that may notify applications of the occurrence of an event.

Next, the client system attempts to create a connection using a connection-oriented protocol (act 904) and receive client data associated with the one or more of the plurality of applications over the connection. Client data may include, but is not limited to, data associated with the occurrence of the event. The connection-oriented protocol can be any of the protocols associated with steps 306 and 307 in FIG. 3.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a network system including a server system, a client system, and one or more other network devices, wherein the server system monitors the occurrence of events, sends notification data to the client system, when notification has been requested, after one of the monitored events occurs, and may have client data requiring transmission to the client system, a method for efficiently sending notification to the client system when the event has occurred, so as to preserve the processing capacity of the server system and the client system, and so as to preserve bandwidth on the network system, the method comprising:

an act of the server system determining that a notification is to be sent to the client system upon the occurrence of one of the monitored events;

an act of the server system sending notification data using a connectionless protocol to the client system, if one of the monitored events occurs;

an act of determining if the server system has client data to transmit to the client system and upon determining that the server system has client data to transmit, initiating contact with the client device using a connection-oriented protocol when the server system has client data to transmit to the client system; and an act of the server system transmitting the client data to the client system using exclusively the connection-oriented protocol to transmit the client data, after the server system receives contact using the connection-oriented protocol, and without first attempting to transmit the client data to the client using the connectionless protocol.

2. A method as recited in claim 1 wherein the server system determines that a notification is to be sent to the client system by receiving a message from the client system.

3. A method as recited in claim 1 wherein the server system monitors for the occurrence of events by executing separate modules to monitor individual events.

4. A method as recited in claim 1 wherein in the connectionless protocol is User Datagram Protocol.

5. A method as recited in claim 1 wherein the notification data further comprises data that notifies the client system that the server has additional data associated with the occurrence of the event.

6. A method as recited in claim 1 wherein the connection-oriented protocol is Transmission Control Protocol.

7. In a network system including a server system, a client system, and one or more other network devices, wherein the server system monitors the occurrence of events, sends notification data to the client system, when notification has been requested, after one of the monitored events occurs, and may have client data requiring transmission to the client system, a method for efficiently sending notification to the client system when the event has occurred, so as to preserve the processing capacity of the server system and the client system, and so as to preserve bandwidth on the network system, the method comprising:

an act of the server system determining that a notification is to be sent to the client system upon the occurrence of one of the monitored events;

an act of the server system sending notification data using a connectionless protocol to the client system, if one of the monitored events occurs;

an act of determining if the server system has client data to transmit to the client system; and upon determining that the server system has client data to transmit, a step for sending client data, after the notification data is sent, to the client system using exclusively a connection-oriented protocol, and such that the client data is sent to the client system using the connection-oriented protocol without first attempting to transmit the client data to the client using the connectionless protocol.

8. A computer program product for implementing, in a network system including a server system, a client system, and one or more other network devices, wherein the server system monitors the occurrence of events, sends notification data to the client system, when notification has been requested, after one of the monitored events occurs, and may have client data requiring transmission to the client system, a method for efficiently sending notification to the client system when the event has occurred, so as to preserve the processing capacity of the server system and the client system, and so as to preserve bandwidth on the network system, the computer product comprising:

a computer-readable medium carrying computer-executable instructions that, when executed at the server system, cause the server system to perform the following:

an act of the server system determining that a notification is to be sent to the client system upon the occurrence of one of the monitored events;

an act of the server system sending notification data using a connectionless protocol to the client system, if one of the monitored events occurs;

an act of determining if the server system has client data to transmit to the client system and upon determining that the server system has client data to transmit, initiating contact with the client device using a connection-oriented protocol when the server system has client data to transmit to the client system; and an act of the server system transmitting the client data to the client system using exclusively the connection-oriented protocol to transmit the client data, after the server system receives contact using the connection-oriented protocol, and without first attempting to transmit the client data to the client using the connectionless protocol.

9. A computer program product for implementing, in a network system including a server system, a client system, and one or more other network devices, wherein the server system monitors the occurrence of events, sends notification data to the client system, when notification has been requested, after one of the monitored events occurs, and may have client data requiring transmission to the client system, a method for efficiently sending notification to the client system when the event has occurred, so as to preserve the processing capacity of the server system and the client system, and so as to preserve bandwidth on the network system, the computer product comprising:

a computer-readable medium carrying computer-executable instructions that, when executed at the server system, cause the server system to perform the following:

an act of the server system determining that a notification is to be sent to the client system upon the occurrence of one of the monitored events;

an act of the server system sending notification data using a connectionless protocol to the client system, if one of the monitored events occurs;

an act of determining if the server system has client data to transmit to the client system; and upon determining that the server system has client data to transmit, a step for sending client data, after the notification data is sent, to the client system using exclusively a connection-oriented protocol and such that the client data is sent to the client system using the connection-oriented protocol without first attempting to transmit the client data to the client using the connectionless protocol.

10. A method as recited in claim 1, the method further comprising:

an act of the server system resending the notification data a plurality of times using the connectionless protocol to the client system at time intervals which, at least for a time, increase after each failure to detect the establishment of a communication link using the connection-oriented protocol from the client system, wherein the resending occurs until a communication link using a connection-oriented protocol is established from the client system or until a timeout period has elapsed; and wherein the server system sends the additional data to the client system if once the communication link using the connection-oriented protocol is established.

11. A method as recited in claim 10, wherein the time interval doubles after each successive failure to establish communication.

12. A computer program product as recited in claim 8, wherein the method further comprises:

an act of resending the notification data a plurality of times using the connectionless protocol to the client system at time intervals which, at least for a time, increase after each failure to detect the establishment of a communication link using the connection-oriented protocol from the client system, wherein the resending occurs until a communication link using the connection-oriented protocol is established from the client system or until a timeout period has elapsed; and wherein the server system sends the additional data to the client system once the communication link using the connection-oriented protocol is established.

13. A method as recited in claim 1, further comprising:

the server system associating a separate storage location with the client system and using the separate storage location to store data on the occurrence of each of the multiple events; and the server system appending to the separate storage location the occurrence of each of the multiple events in order to save a record of the occurrence of each event until sending the one notification to the client system indicating that the multiple events have occurred.

14. A method as recited in claim 1, further comprising the server system monitoring for the occurrence of the one or more events by executing separate modules to monitor individual events.

15. A method as recited in claim 1, wherein the connectionless protocol is User Datagram Protocol.

16. A method as recited in claim 15 wherein the simultaneous notification comprises receipt of one User Datagram Protocol packet.

17. In a network system including a server system and a client system, wherein the server system monitors the occurrence of events, sends notification to the client system when one of the monitored events occurs, and may have client data requiring transmission to the client system, a method for efficiently notifying applications associated with the client system when an event has occurred so as to preserve the processing capacity of server system and the client system, and so as to preserve bandwidth on the network system, the method comprising:

receiving, from one of a plurality of applications associated with the client system, a request to be notified of an occurrence of an event;

determining if the request to be notified of the occurrence of the event has been received previously, and if not sending the request to be notified of the occurrence of the event to the server system;

an act of the client system receiving one notification from the server system using a connectionless protocol notifying the client system of the occurrence of the event;

an act of the client system determining which of the plurality of applications requested notification of the occurrence of the event;

an act of the client system transmitting the received notification to each application that requested notification of the occurrence of the event;

the client system determining if the server system has additional client data associated with the occurrence of the event; and the client system, in response to determining that the server system has additional client data associated with the occurrence of the event, creating a connection using a connection-oriented protocol to receive client data associated with the occurrence of the event, and without first receiving an attempt from the server to transmit the client data over the connectionless protocol.

18. A method as recited in claim 17 wherein the client system comprises a module to detect the one or more of a plurality of applications.

19. A method as recited in claim 18 wherein the act of transmitting the received notification to one or more of the plurality of applications comprises the module transmitting the received notification.

20. A method as recited in claim 17 wherein the connectionless protocol is the User Datagram Protocol.

21. A method as recited in claim 17 wherein the connection oriented protocol is Transmission Control Protocol.

22. A computer product claim for implementing, in a network system including a server system and a client system, wherein the server system monitors the occurrence of events, sends notification to the client system when one of the monitored events occurs, and may have client data requiring transmission to the client system, a method for efficiently notifying applications associated with the client system when an event has occurred so as to preserve the processing capacity of server system and the client system, and so as to preserve bandwidth on the network system, the computer product comprising:

a computer-readable medium carry computer executable-instructions that, when executed at the client computer, cause the client computer to perform the following:

receiving, from one of a plurality of applications associated with the client system, a request to be notified of an occurrence of an event;

determining if the request to be notified of the occurrence of the event has been received previously, and if not sending the request to be notified of the occurrence of the event to the server system;

an act of receiving one notification from the server system using a connectionless protocol notifying the client system of the occurrence of the event;

an act of the client system determining which of the plurality of applications requested notification of the occurrence of the event;

an act of the client system transmitting the received notification to each application that requested notification of the occurrence of the event;

the client system determining if the server system has additional client data associated with the occurrence of the event; and the client system, in response to determining that the server system has additional client data associated with the occurrence of the event, creating a connection using a connection-oriented protocol to receive client data associated with the occurrence of the event, and without first receiving an attempt from the server to transmit the client data over the connectionless protocol.

* * * * *

UNITED STATES PATENT AND TRADEMARK OFFICE
CERTIFICATE OF CORRECTION

PATENT NO. : 6,999,992 B1
APPLICATION NO. : 09/680122
DATED : February 14, 2006
INVENTOR(S) : Deen et al.

It is certified that error appears in the above-identified patent and that said Letters Patent is hereby corrected as shown below:

On the Title Page, Item (75), in "Inventors", line 1, delete "Brian Deen" and insert -- Brian J. Deen --, therefor.

On the Title Page, Item (75), in "Inventors", line 3, delete "Alex Hopmann" and insert -- Alexander I. Hopmann --, therefor.

On the Title Page, Item (56), in "U.S. Patent Documents", line 7, below
"6,704,786 B1 * 3/2004 Gupta et al. ........... 709/228"
insert -- OTHER PUBLICATIONS
Cohen et al., INTERNET DRAFT–General Event Notification Architecture Base, Dated July 9, 1998.
Wechta, Jerzy, Martin Fricker, and Fred Halsall, Hop-by-Hop Flow Control as a Method to Improve QoS in 802.3 LANs, IEEE, 1999. --.

In column 1, line 34, delete "("TCP')" and insert -- ("TCP") --, therefor.

In column 8, line 58, delete "electromechanical" and insert -- electro-mechanical --, therefor.

In column 16, line 18, in Claim 9, after "protocol" insert -- , --.

In column 16, line 35, in Claim 10, after "system" delete "if".

In column 18, line 3–4, in Claim 21, delete "connection oriented" and insert -- connection-oriented --, therefor.

In column 18, line 16–17, in Claim 22, delete "computer executable-instructions" and insert -- computer-executable instructions --, therefor.

Signed and Sealed this

Twenty-third Day of March, 2010

David J. Kappos
*Director of the United States Patent and Trademark Office*